INVENTORS.
GENE D. BARBER
BILL L. WADDELL
BY Charles A. Weigel

ATTORNEY

Sept. 24, 1963  G. D. BARBER  3,105,155
MAGNETIC COMPARATOR
Filed March 24, 1960  2 Sheets-Sheet 2

INPUT FROM WINDING 20

INVENTORS.
GENE D. BARBER
BILL L. WADDELL
BY Charles A. Weigel, Jr.
ATTORNEY

United States Patent Office 3,105,155
Patented Sept. 24, 1963

3,105,155
MAGNETIC COMPARATOR
Gene D. Barber, Escondido, and Bill L. Waddell, San Diego, Calif., assignors, by mesne assignments, to Daystrom, Incorporated, Murray Hill, N.J., a corporation of Texas
Filed Mar. 24, 1960, Ser. No. 17,423
4 Claims. (Cl. 307—88)

This invention relates to a comparator system and more particularly to a device utilizing magnetic cores in a system for detecting a plurality of low level signals. In a preferred embodiment of this invention, the comparator device may be employed in a system to detect deviations of a plurality of input signals from corresponding set points.

In telemetering systems, automatic control systems and the like, the system sensitivity is usually determined by the sensitivity of the input sensing devices, or transducers, which detect changes in the input electrical or physical quantities. Often the system sensitivity is the critical factor in determining the accuracy and the utility of the system. For example, in a real time process control system, such as a refining process, small changes in temperature, pressures, etc., must be accurately and rapidly detected. In fact, detection of thermocouple currents of less than one microampere are illustrative of the required sensitivity. Further, it is desirable that the detecting device be relatively electrically isolated from the input sensing devices, have low drift, be relatively insensitive to mechanical vibration, and have fast response time.

In the past, detecting or comparing devices that have been available to industry have not been entirely satisfactory. One such comparator device, for example, is known as a pyromillivoltmeter. A pyromillivoltmeter may be used to compare a temperature, for example, as represented by a thermocouple current, to a temperature set point. A pyromillivoltmeter usually includes a galvanometer arrangement with a facility for detecting the physical position of the galvanometer pointer. While such pyromillivoltmeters are in general use today, they have several disadvantages. For example, their ability to detect rapidly changing temperatures is somewhat limited by the inertia of the pointer. In general, the galvanometer is not electrically isolated from the input sensing devices and thus may impair their ability to provide an accurate indication. Also, a highly sensitive galvanometer that is not subject to drift, temperature variations, or mechanical vibration, is relatively expensive. Further, and even more important, is the fact that if several quantities are to be monitored, the cost of several galvanometer arrangements becomes prohibitive.

It is, therefore, an object of this invention to accurately compare relatively small amplitude electrical signals.

Another object of this invention is to accurately monitor a plurality of relatively small amplitude electrical signals with relatively low drift, fast action, and over a relatively wide range of signal amplitude.

Still another object of this invention is to monitor a plurality of low level input voltages or currents and to indicate input voltages or currents which exceed predetermined limits.

In one form of the invention, a plurality of comparator devices are coupled to be driven from a common drive pulse source. Each comparator device includes a pair of magnetic cores. The operation is such that with the occurrence of each drive pulse each device produces a periodic output pulse that is variable in amplitude and polarity depending on the magnitude and polarity of the input signal relative to the reference, or set point signal.

In each device, an input signal to be detected or compared is introduced to a winding which is wound about both magnetic cores, and an output signal is induced in a winding also wound about both cores. In the absence of an input signal, the resultant flux changes caused by the drive pulses in the two cores are equal and opposite in direction through the output winding. Thus, no output signal results. On the other hand, in the presence of an input signal, each of the cores is magnetically biased in the same direction (resulting in a shift of the quiescent magnetic operating points of the cores) so that the resultant flux changes in the two cores during each drive pulse, are no longer equal and opposite through the output winding. Thus, an output pulse signal is developed across the output winding which has a magnitude and polarity related to the algebraic sum of the rate of flux changes and thus to the input signal. Since these flux changes occur generally during each drive pulse, which is a relatively fixed time interval, it may be said that the output signal is a function of the algebraic sum of the flux changes.

In alternative embodiments of the invention, several discrete input signals may be applied to several different input windings, in which case the output pulse signal is a function of the algebraic sum of the several input signals. By using this alternative, one of the input signals may be a reference signal to which the other input signal or signals is to be compared.

Further advantages and features of this invention will become apparent upon consideration of the following description read in conjunction with the drawings, wherein.

Figure 1:
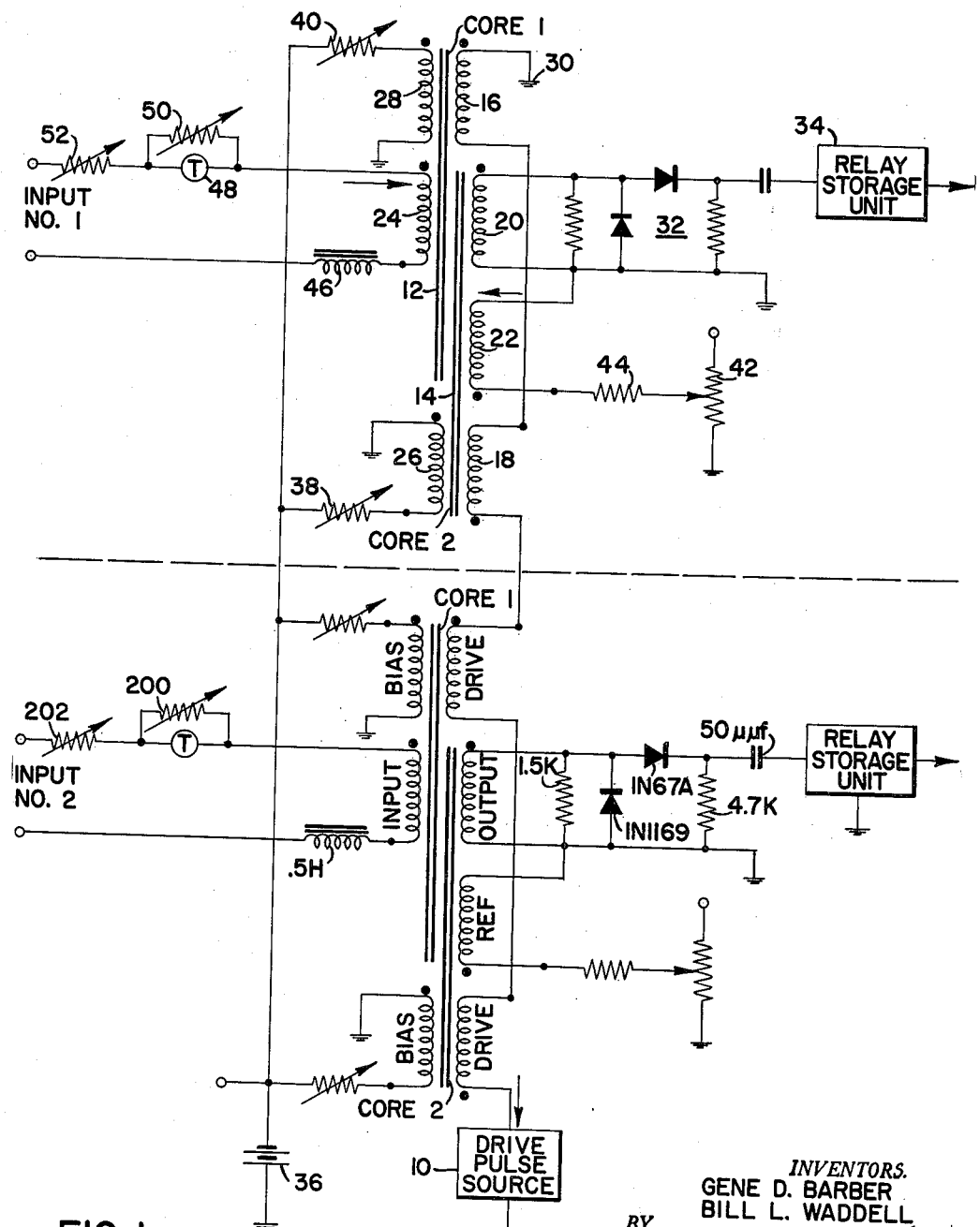
FIGURE 1 is a part schematic and part block diagram of a plural channel comparator system constructed in accordance with this invention.

Illustrated in FIG. 1 are two channels of a magnetic comparator which may be operated in accordance with the concept of the present invention. Although only two channels are shown, it should be obvious that a greater or lesser number may be employed as desired, to operate from a single drive pulse source 10. This drive pulse source 10 may be a blocking oscillator, a magnetic pulse generator, a free running multivibrator, or other suitable pulse source that provides pulses having a short duty cycle and a relatively large power output. For example, if a free running multivibrator is employed, it may be necessary to allow the multivibrator to trigger a one-shot multivibrator which in turn drives a power amplifier.

Since each of the channels is substantially identical, only the construction and operation of the upper input channel will be described in detail. Thus, the magnetic sensing device of the upper channel includes first and second magnetic cores 12 and 14, respectively which are diagrammatically depicted. Each of the cores 12 and 14, may be made of "Permalloy" (78% nickel and 22% iron), a ferrite, or any other material exhibiting a magnetic hysteresis loop such as tape wound cores, or cores made of a magnetic film. The principal requirement is that the core material have a hysteresis characteristic of the general type illustrated in FIG. 2 (in which the magnetization, or flux density B, is plotted against the magnetizing force, or magnetic intensity H).

The term "hysteresis" denotes a lagging of the magnetic flux in a magnetic material behind the magnetizing force which is producing it, i.e., as the magnetizing force H is varied in opposite directions, the resulting magnetc flux densities B are different. The slope of the hysteresis loop at any point, i.e., the ratio of an incremental change in flux to the incremental change in magnetizing force H that produced such change, is known as the differential permeability of the core material. It is evident, therefore, that the differential permeability of the core material changes with the magnitude and direction of the magnetizing force applied to the cores 12 and 14.

In the basic comparator device, each of the first and second cores 12 and 14, respectively, are assembled with two individual windings (a bias winding and a drive winding) and three common windings. The individual windings on the first core 12 are a drive winding 16 and a bias winding 28. Similarly, the second core 14 has a drive winding 18 and a bias winding 26. The two cores 12 and 14 are then placed together and several windings are added which are common to both cores. These added windings include an input signal winding 24, an output signal winding 20 and a reference signal winding 22. Note that the drive windings 16 and 18 are serially connected together between a point of reference potential, or ground 30, and to the source of drive pulses 10. Note that the drive windings from the second channel of the comparator system, and those drive windings from any additional channels that may be employed, are all connected in series.

The dots at each winding are used in the conventional manner to indicate similar polarities. Thus, if a current flows through one winding so that the dot end is positive-going, the field set up in the core or cores associated with that winding induces voltages in the other windings making their dot end positive-going at the same time. From the arrangement of the dots illustrated, it is noted that the drive windings 16 and 18, associated with the first and second cores 12 and 14, respectively, are connected in series opposition. The bias currents for the bias windings 26 and 28, respectively, are supplied by a common source of negative potential such as a battery 36 through variable resistors 38 and 40, respectively. The reference current for the reference signal winding 22 is supplied through a potentiometer 42 connected to the negative terminal of the battery 36 (the connection is denoted by the $x$ marks). The arm of the potentiometer is serially connected through a resistor 44 and the reference signal winding 22 to ground. The output winding 20 in each channel is coupled through a conventional diode detector 32 to a relay storage unit 34, the details of which are described in FIG. 3.

Figure 2:
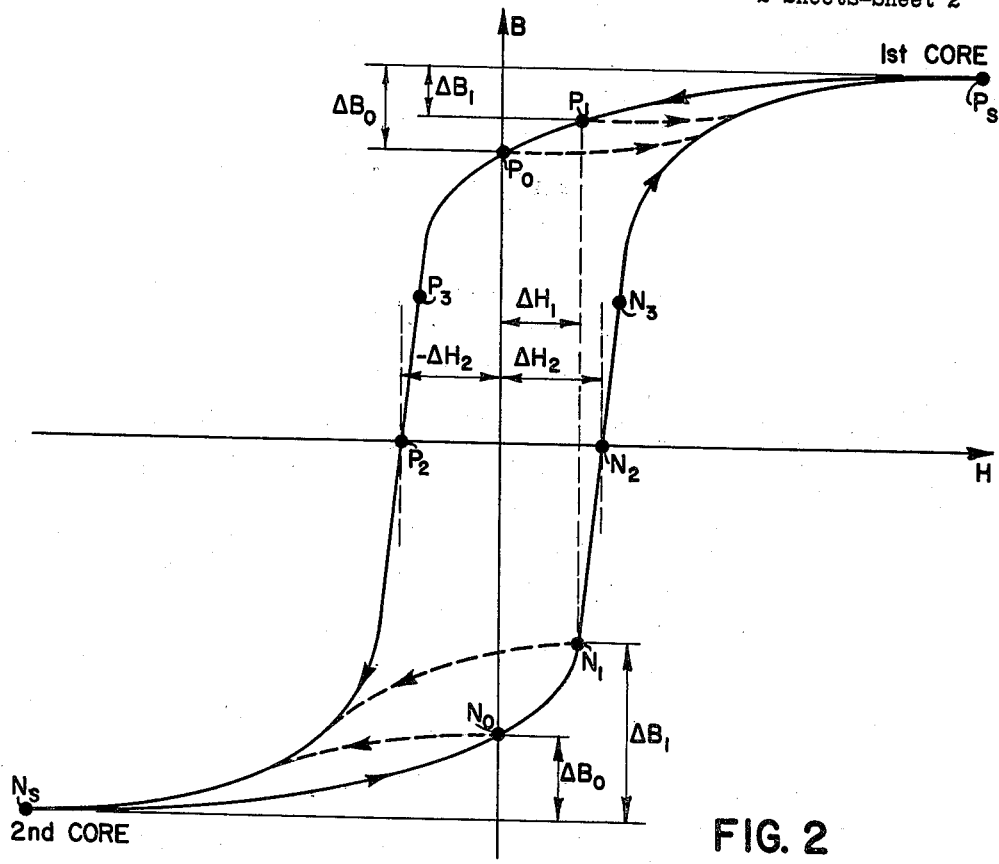
FIGURE 2 is a hysteresis curve, wherein the flux density B is plotted against the magnetic intensity H, to illustrate the operating magnetic states of typical magnetic cores that may be utilized in the comparator system of FIG. 1.

In describing the operation of the magnetic comparator, the explanation of the function of the bias signal windings 26 and 28 will be deferred until a later point. If there is no input signal current flowing through the input signal winding 24 and there is no reference signal current flowing through the reference signal winding 22, with the occurrence of each negative going drive pulse (positive going drive pulses may also be used) from the drive pulse source 10, the first core 12 is driven to a condition of positive magnetic saturation illustrated by the point $P_s$ (FIG. 2), and then allowed to return to a condition of positive remanent magnetization illustrated by the point $P_0$ (FIG. 2). Similarly, the second core 14 is driven successively to a conditon that may be designated negative saturation $N_s$ (FIG. 2) and then allowed to return to a condition that may be designated negative remanent magnetization $N_0$ (FIG. 2).

In the absence of input signals, reference signals, and bias signals, and after several drive pulses have occurred, with the occurrence of each succeeding pulse, the hysteresis action of the first core 12 may be described with reference to FIG. 2 as from the point of positive remanent magnetization $P_0$, which is on the positive portion of the ordinate, moving with the application of a positive magnetizing force to the right and up via the dotted line until the point of positive saturation $P_s$ is reached. With the cessation of the negative magnetizing force, the magnetic condition of the first core 12 may be illustrated by the hysteresis loop beginning from positive saturation $P_s$, downward and to the left via the solid line until the core reaches its stable point of positive remanent saturation.

Referring again to FIG. 2, the hysteresis loop defined by the magnetic condition of the second core 14 beginning from the point of negative residual magnetization $N_0$, which lies on the negative ordinate of FIG. 2, is seen to progress downward and to the left with increasing magnetizing force H, via the dotted line, to negative saturation $N_s$. With the cessation of the negative magnetizing force, the magnetic condition of the second core 14 is again illustrated by the hysteresis loop of FIG. 2 which progresses upward and to the right via the solid line until the point of negative remanent magnetization $N_0$ is reached.

Since the first core 12 returns to the condition of positive remanent magnetization, indicated by the point $P_0$, after each drive pulse, the point $P_0$ is referred to as the quiescent magnetic operating point of the core. In similar manner, the condition indicated by the point $N_0$ is termed the quiescent magnetic operating point of the second core 14. Note that during each cycle of oscillation if the cores have similar characteristics, the flux change $\Delta B_0$ occurring in the first core 12 is equal and opposite to the flux change $\Delta B_0$ occurring in the second core 14. Accordingly, the algebraic sum of the rate of flux changes or the resultant rate of flux change in the output winding 20 is zero and the output voltage induced therein by each of these flux changes is cancelled. But it will be recalled that the flux changes occur in a fixed time interval—hence, the output voltage is proportional simply to the total flux change that occurs within this relatively fixed time interval.

If now a small current, for example, typically in the order of one milliampere, is passed through the input signal winding 24 flowing into the dot, both the first and second cores 12 and 14, respectively, are biased in the same direction by the same amount (illustrated as a positive magnetizing force $+\Delta H_1$ in FIG. 2). It is therefore apparent that the application of an input signal to either of windings 22 or 24 causes the quiescent magnetic operating point of the cores to change by an amount and in a sense determined by the magnitude and polarity of the input signal. Note that with the biasing assumed, the quiescent magnetic operating point of the first core 12 moves closer to the condition of positive saturation whereas that of the second core 14 moves farther away from the condition of negative saturation.

For an input signal of the opposite polarity both cores would be energized by a magnetizing force in the opposite direction. However, with the input signal of the direction assumed, and with the occurrence of each successive drive pulse from the source 10, each of the cores are driven respectively to positive and negative saturation and then allowed to return to their respective quiescent magnetic operating points $P_1$ and $N_1$. The hysteresis paths followed by the respective cores are illustrated in FIG. 2. Thus, the magnetic condition of the first core 12, for example, is illustrated as progressing from its quiescent magnetic operating point $P_1$, upward and to the right under the influence of a positive magnetizing force as shown by the dotted line to positive saturation $P_s$, thence downward and to the right along the upper solid line back to its quiescent operating point $P_1$. Similarly, the magnetization of the second core is illustrated graphically as progressing from its quiescent operating point $N_1$ downward and to the left under the influence of a negative magnetizing force over the path illustrated by the dotted line to negative saturation $N_s$, thence upward and to the right along the lower solid line to its quiescent operating point $N_1$.

Since as noted above, the first core was closer to magnetic saturation than the second core, with the occurrence of each drive pulse from the drive pulse source 10, the flux change occurring in the respective cores, while in opposite directions, is of different magnitude. Specifically, the flux change occurring in the first core 12 (illustrated as $\Delta B_1$ in FIG. 2) is much less than the flux change occurring in the second core 14 (also illustrated as $\Delta B_1$ in FIG. 2). This means that each such drive pulse develops a resultant flux change that links the output signal winding 20. This resultant flux change induces an output voltage in the output signal winding 20 that varies in magnitude and polarity with the instantaneous magnitude and polarity of the input signal.

Each of the comparators in the respective channels may be utilized to detect the algebraic sum of two or more input signal currents or to compare one or more input signals to a reference level signal such as a set point. For example, a current from a thermocouple may be introduced into the input signal winding 24 and compared to a reference temperature as represented by the current applied to the reference signal winding 22. Thus, if the potentiometer 42 is adjusted such that current is flowing through the reference winding 22 in the direction of the arrow (such that the dot end is negative going), a negative magnetizing force is applied to each of the first and second cores 12 and 14, respectively. If the thermocouple current is flowing into the input signal winding 24 in a direction of the arrow (such that the dot end is positive-going) the input signal winding tends to apply a positive magnetizing force to each of the first and second cores 12 and 14, respectively. If the currents established by each of the reference and signal windings 22 and 24, respectively, are equal in magnitude, the magnetizing force established by each cancels each other so that the quiescent operating points of the first and second cores 12 and 14 remains the same and no recurring output signal occurs with each drive pulse. If, however, either of the two signals is larger than the other, the difference in magnitude is detected due to the change in quiescent operating points of the cores. Thus, with the occurrence of each drive pulse, the resulting output signal is either positive or negative depending upon the polarity and magnitude of the several input signals. In general usage, the reference signal winding 22 functions to subtract from the magnetizing effects of the input signal winding 24 and thus to provide a reference, or set point, to which the input signal current may be compared.

With current flowing through the reference winding 22 in the direction of the arrow (the dot end is negative going), the quiescent magnetic operating point of each of the two cores are shifted in a negative direction $-H$. If now an input signal is applied to the input signal winding 24 with current flowing in such direction as to make the dot end of the winding positive-going, the effect of the magnetizing force of the reference signal winding 22 is reduced by an amount depending upon the magnitude of the input signal current. If the magnetizing force produced by the input signal winding 24 is less than that produced by reference winding 22 (indicating that the input current is less than the reference current), the flux change occurring in the second core, with the occurrence of each drive pulse, is less than the flux change occurring in the first core. Consequently, successive positive-going pulses are induced in the output winding 20.

If the input signal current increases to the point where it exceeds the reference signal current, say, to the extent that the quiescent magnetic operating points again become points $P_1$ and $N_1$ (as illustrated in FIG. 2) the output pulses become negative. Thus, it is apparent that the input signal current may be readily compared to the reference signal current, and depending upon whether the output pulse is zero, positive, or negative, it may be determined that the input signal current is correspondingly equal to, less than, or more than the reference signal current which may represent a set point temperature or pressure.

The sensitivity of the device depends in part upon the differential permeability of the cores. As will be observed from its definition, the differential permeability of a core is determined by the quiescent operating point of the core. Thus, the sensitivity of each of the comparator devices in each of the channels of FIG. 1 may be varied by means of the bias winding (26 on the second core 14, and 28 on the first core 12). These windings function to shift the quiescent operating point of the respective cores 12 and 14. To obtain maximum sensitivity the respective variable resistors 38 and 40, which are connected to the negative terminal of the battery 36, are adjusted to supply a magnetizing force sufficient to shift the quiescent magnetic operating point of each of the cores to that point at which they have the greatest differential permeability. As may be observed from the hysteresis loop of FIG. 2, these points of maximum differential permeability occur at the points of zero flux, represented by the points $P_2$ and $N_2$ (FIG. 2) for the first and second cores, respectively.

Thus, to shift the first core 12 from its point of remanent magnetization $P_0$ to a new quiescent operating point $P_2$ at which the differential permeability is the greatest, it is necessary to apply a negative going magnetizing force, illustrated as $-\Delta H_2$. To shift the quiescent operating point of the second core 14 in an opposite direction, from its point of remanent magnetization ($N_0$, FIG. 2) to the point $N_2$, at which the differential permeability is greatest, it is necessary to apply a positive magnetizing force illustrated in FIG. 2 as $\Delta H_2$. It may be noted that at these points of maximum differential permeability, a smaller input signal is required to produce the same amplitude output pulse.

Note that at these operating points, in the absence of both input signal currents and reference signal currents, the flux change occurring with each drive pulse in the cores remain equal and opposite. When an input signal current is introduced, however, the quiescent operating points are shifted in the same direction in each core as described above such that a difference in flux density develops in the output winding in the manner described.

Thus, when the input signal current does not exceed the reference signal current indicating, for example, that the temperature being detected by the thermocouple does not exceed its set point, successive positive pulses are provided in the output winding 20. These positive pulses are detected by the diode detector circuit 32 to provide a positive output signal to the relay storage unit 34. Thus, when operating the system, each relay storage unit 34 receives successive input signals so long as the current flowing in the input winding, which is representative of some physical quantity being sensed, for example, does not exceed its set point.

Figure 3:
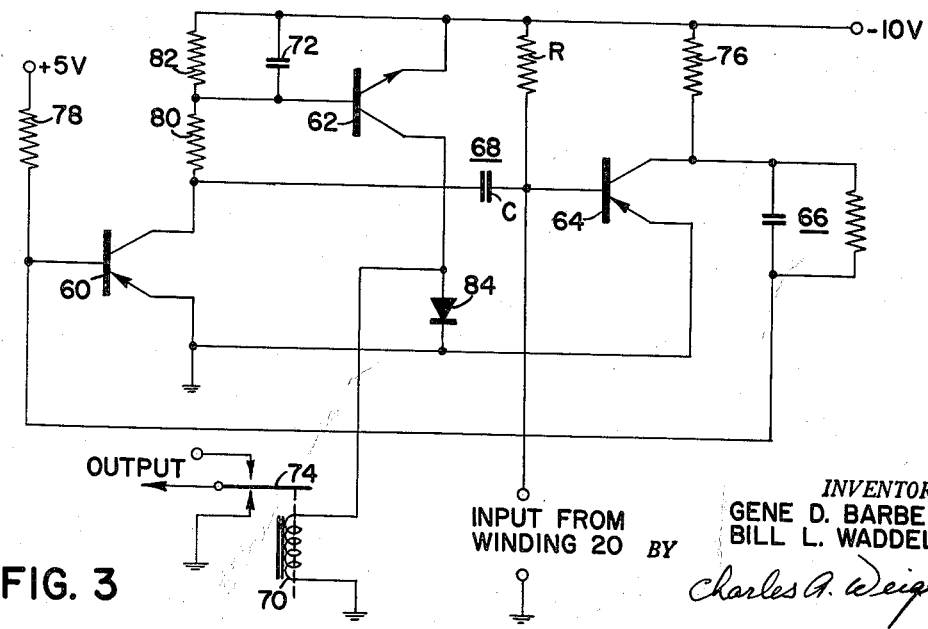
FIGURE 3 is a circuit diagram of a suitable relay storage unit which may be used in the system of FIG. 1.

FIG. 3 illustrates the circuit details of a suitable relay storage unit which includes three transistors 60, 62 and 64. The first and third transistors 60 and 64 are connected in a circuit to form a conventional monostable multivibrator, the output of which is coupled through the second transistor 62 which operates as a relay driver. The multivibrator circuit includes a first collector resistor 76, an R-C cross coupling network 66, a base electrode biasing resistor 78, second and third collector resistors 80, 82, and a relay bypass diode 84. Thus, positive pulses from the output winding 20 (FIG. 1) of the comparator pass through the detecting circuit 32 (FIG. 1) to turn off the third transistor 64 and turn on the first transistor 60 by the well-known regenerative switching action of a monostable multivibrator. The time constant of an R-C network 68 including a resistor R and a capacitor C determines the time interval during which the third transistor 64 remains cut off. Thus, after the capacitor C in the R-C network 68 discharges through its associated resistor R, the third transistor 64 again becomes conductive to await the receipt of the next positive pulse from the detector circuit 32 (FIG. 1).

During the time interval that the first transistor 60 is conductive, most of its collector current flows to the base electrode of the relay driver second transistor 62 and thus charges a capacitor 72. The relay drive second transistor 62 energizes a relay 70. In between pulses, the relay drive second transistor 62 is maintained in a state of conduction by the charge on the capacitor 72. This prevents the relay 70 from chattering, by acting as a pulse stretcher. The relay 70, having a rocker arm 74, may be used to control any indicating device as desired, such as a lamp, an audio oscillator and the like to provide an alarm, for example, if the input signal current exceeds the reference signal current. Thus, the relay is energized so long as the input signal winding current does not exceed the reference signal current.

To obtain a 400 ohm impedance for the input circuit of FIG. 1 to match a typical thermocouple and yet maintain the desired accuracy, it is necessary to hold this resistance constant with variations in temperature. Thus, in an illustrative circuit, the input signal winding 24 and associated choke coil 46 may have approximately 250 ohms of wire resistance with a positive temperature coefficient. To compensate for the positive temperature coefficient, a thermistor 48, which has a negative temperature coefficient, shunted by a resistor 50, may be placed in series. The input potentiometer 52 may then be adjusted to maintain the input circuit impedance at $400 \pm .5$ ohms.

There has thus been described a relatively simple yet highly accurate and stable multiple channel magnetic comparator that is capable of sensing or comparing relatively low level input signals with a determinable fixed or adjustable reference signal to initiate an alarm, if desired, in the event that the input signal or signals exceeds the selected reference level.

One of the advantages of using this multichannel magnetic comparator is that the input signals are isolated from the sensing devices, such that the thermocouple or other transducer, as the case may be, has no direct feed through to the output circuit.

Further, the comparator has low drift due to the solid state components and has no moving parts other than the final output relay. The sampling rate may be made quite rapid by variation of the pulse rate of the drive pulses. The several comparators may all be driven from the same driving source 10. Finally, the sensitivity of this device is quite high, particularly if the quiescent operating point is selected by the adjustment of bias current to be at the point of maximum differential permeability for the cores. Also, the input signals may be inverted or scaled as desired merely by varying the winding direction or number of turns.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

What is claimed is:
1. Apparatus for monitoring a physical condition of interest comprising:
    circuit means for supplying an input signal representative of the condition;
    magnetic core comparing circuit means responsive to the input signal for developing repetitive signal indications so long as the input signal does not reach a predetermined reference level;
    circuit means responsive to each of the signal indications for generating a pulse of uniform character;
    circuit means for energizing an indicating device;
    and circuit means responsive to the uniform pulses for disabling the energizing circuit means so long as the uniform pulses occur at greater than a predetermined rate.

2. Apparatus for monitoring a physical condition of interest comprising:
    circuit means for supplying an input signal representative of the condition;
    magnetic core comparing circuit means responsive to the input signal for developing repetitive signal indications so long as the input signal does not reach a predetermined reference level;
    circuit means responsive to each of the signal indications for generating a pulse of uniform character;
    circuit means responsive to the resulting train of uniform pulses for developing a signal representative of the average value thereof;
    circuit means for energizing an indicating device;
    and relay means responsive to the average value signal for maintaining the energizing circuit means in an inoperative condition so long as the average value signal is greater than a predetermined value.

3. Apparatus for monitoring a physical condition of interest comprising:
    magnetic core means;
    input circuit means for establishing in the core means a magnetic flux representative of the condition of interest;
    circuit means for establishing in the core means a magnetic flux condition representative of a predetermined limit for the physical condition;
    output circuit means responsive to flux changes in the core means for producing indications thereof;
    circuit means for repetitively driving the core means through successive hysteresis cycles for developing repetitive signal indications in the output circuit means so long as the condition of interest does not reach the predetermined limit;
    circuit means responsive to each of the signal indications for generating a pulse of uniform character;
    circuit means for energizing an indicating device;
    and circuit means responsive to the uniform pulses for disabling the energizing circuit means so long as the uniform pulses occur at greater than a predetermined rate.

4. Apparatus for monitoring a physical condition of interest comprising:
    magnetic core means;
    input circuit means for establishing in the core means a magnetic flux representative of the condition of interest;
    circuit means for establishing in the core means a magnetic flux condition representative of a predetermined limit for the physical condition;
    output circuit means responsive to flux changes in the core means for producing indications thereof;
    driving pulse circuit means for repetitively driving the core means through successive hysteresis cycles for developing repetitive signal indications in the output circuit means so long as the condition of interest does not reach the predetermined limit;

monostable pulse generating circuit means responsive to each of the signal indications for generating a pulse of uniform character;

circuit means responsive to the resulting train of uniform pulses for developing a signal representative of the average value thereof;

circuit means for energizing an indicating device;

and relay means responsive to the average value signal for maintaining the energizing circuit means in an inoperative condition so long as the average value signal is greater than a predetermined value.

References Cited in the file of this patent

UNITED STATES PATENTS

| | | |
|---|---|---|
| 2,809,353 | Brown | Oct. 8, 1957 |
| 2,989,648 | Kalbfell | June 20, 1961 |
| 2,997,692 | Lomy | Aug. 22, 1961 |